United States Patent
Walker

(10) Patent No.: US 6,894,008 B2
(45) Date of Patent: May 17, 2005

(54) METHOD OF INCREASING PH OF HIGH-DENSITY BRINES

(75) Inventor: Michael L. Walker, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/726,936

(22) Filed: Dec. 3, 2003

(65) Prior Publication Data

US 2004/0082485 A1 Apr. 29, 2004

Related U.S. Application Data

(63) Continuation-in-part of application No. 10/192,023, filed on Jul. 10, 2002, now abandoned.
(60) Provisional application No. 60/305,036, filed on Jul. 11, 2001.

(51) Int. Cl.[7] ........................ E21B 43/22; E21B 43/28; C09K 7/02; C09K 7/04; C09K 15/02
(52) U.S. Cl. ........................ 507/272; 507/269; 507/276; 507/277; 507/939; 166/268; 166/270; 166/310; 166/242.4; 166/902; 252/387; 252/397; 252/175
(58) Field of Search ........................ 252/387, 397, 252/175; 507/269, 272, 276, 277, 939; 166/268, 270, 310, 242.4, 902

(56) References Cited

U.S. PATENT DOCUMENTS

| | | | |
|---|---|---|---|
| 2,581,540 A | | 1/1952 | Kennedy et al. |
| 2,789,949 A | | 4/1957 | Scotty |
| 2,894,584 A | * | 7/1959 | Birdwell et al. ............ 166/297 |
| 2,898,294 A | * | 8/1959 | Birdwell et al. ............ 507/203 |
| 4,175,042 A | | 11/1979 | Mondshine |
| 4,381,241 A | * | 4/1983 | Romenesko et al. ........ 507/127 |
| 4,541,485 A | * | 9/1985 | Block ........................ 166/281 |
| 4,762,178 A | | 8/1988 | Falls et al. |
| 4,784,778 A | | 11/1988 | Shin |
| 4,784,779 A | | 11/1988 | Dadgar |
| 4,822,500 A | | 4/1989 | Dobson, Jr. et al. |
| 4,943,432 A | | 7/1990 | Beiner |
| 5,439,058 A | * | 8/1995 | Malbrel et al. ............. 166/300 |
| 6,019,903 A | | 2/2000 | Gallup |
| 6,103,100 A | | 8/2000 | Hart |

FOREIGN PATENT DOCUMENTS

| | | |
|---|---|---|
| EP | 0 758 011 A1 | 2/1997 |
| EP | 0 845 520 A1 | 6/1998 |
| EP | 1 038 936 A1 | 9/2000 |
| GB | 799192 | 8/1958 |

OTHER PUBLICATIONS

"Brine Crystallization Kit Instruction Manual," Fann Instrument Company, 1985, Houston, Texas.

PCT International Search Report for International Application No. PCT/US02/22037, Nov. 11, 2002.

\* cited by examiner

*Primary Examiner*—Joseph D. Anthony
(74) *Attorney, Agent, or Firm*—Madan, Mossman & Sriram P.C.

(57) ABSTRACT

It has been discovered that carbonate powders and bicarbonate powders are useful to increase the pH and corrosion resistance of high-density brines, such as zinc bromide brines, without significantly reducing their densities. The carbonates and/or bicarbonates should be water-soluble and may be sodium, potassium, magnesium and/or ammonium carbonates and/or bicarbonates and the like. The carbonates and/or bicarbonates are easily added in powder or other finely divided solid form.

10 Claims, No Drawings

METHOD OF INCREASING PH OF HIGH-DENSITY BRINES

CROSS-REFERENCE TO RELATED APPLICATION

This application claims the benefit of U.S. Provisional Application No. 60/305,036 filed Jul. 11, 2001. This application is a continuation-in-part of U.S. patent application Ser. No. 10/192,023 filed Jul. 10, 2002, now abandoned.

FIELD OF THE INVENTION

The instant invention relates to brine fluids, such as those used in recovering hydrocarbons, and more particularly relates, in one embodiment, to high-density brine fluids with improved corrosion resistance.

BACKGROUND OF THE INVENTION

High-density brine fluids are known to be applied in situations where control of pressure in a well is needed. Many different soluble salts may be used to achieve the desired density of the aqueous solution. The more common salts used include, but are not necessarily limited to, chloride and/or bromide salts of the following cations: sodium, potassium, calcium and zinc. These salts impart density to the aqueous fluid by dissolving in the medium. A high-density fluid may be understood as one of greater than about 8.4 pounds/gallon (1.0 kg/l) density, preferably from about 8.4 to about 22.5 lbs/gal. (1.0–2.7 kg/l), most preferably from about 9.0 to about 22.0 lbs/gal. (1.1–2.6 kg/l).

The density of these solutions made by dissolving these salts in water is limited by the molecular weight and the solubility of that salt. Zinc is a preferred cation. Zinc salts are desired as components of high-density brines because of their relatively high molecular weight and great solubility in water.

Brines, including zinc-containing brines, have low pH in aqueous solutions inherently. The acid content of these fluids give the brines undesirable characteristics, one of the greatest of which are high corrosion losses that limit the uses and applications of these fluids.

A method and composition that would overcome some of the problems in the conventional brines, particularly high-density brines, would be desirable.

SUMMARY OF THE INVENTION

An object of the present invention is to provide a method to raise the pH and thus raise the corrosion resistance of high-density brine fluids.

Another object of the present invention is to provide high-density brines having an increased pH and improved corrosion resistance through the employment of readily available agents.

In carrying out these and other objects of the invention, there is provided, in one form, a corrosion resistant brine fluid made by a process that involves first providing a brine including water and a source of water-soluble cations where the cations include lithium, sodium, potassium, calcium, magnesium, zinc, ammonium, cesium, rare earths, and mixtures thereof. Next, an additive that can be a water-soluble carbonate powder, water-soluble bicarbonate powder, and mixtures thereof is added to the brine. In one non-limiting embodiment, the cation of the carbonate or bicarbonate may be sodium, potassium, magnesium, ammonium and mixtures thereof. The carbonate or bicarbonate is present in an amount effective to raise the pH of and decrease the corrosion propensity of the brine.

DETAILED DESCRIPTION OF THE INVENTION

The addition of a water-soluble carbonate and/or water-soluble bicarbonate to a high-density brine of sufficient salt content, e.g. zinc bromide, has been discovered to reduce the acidity of the zinc solution. The carbonates and/or bicarbonates are solid materials and are more conveniently and safely transported and added to the brines than are liquids or gases. Preferably, the additives herein are finely divided solids and/or powders. "Water-soluble" is defined herein as the dissolution of from about 0.1 wt. % to about 50 wt. % of the salt in question in water under ambient conditions. "Brine-soluble" has the same definition with respect to brines. The brines with which this invention is concerned are not saturated brines.

The additive powders as described herein have a broad size range of between about 5 to about 500 microns. A preferable lower threshold for the additive powders is 10 microns, a more preferable lower threshold is 104 microns (140 mesh), and a most preferable lower threshold is 178 microns (80 mesh). Conversely, a preferable upper threshold for the additive powders is 450 microns, a more preferable upper threshold is 400 microns (40 mesh), and a most preferable upper threshold is 250 microns (60 mesh). It has been surprisingly discovered that by introducing the carbonate/bicarbonate additive as a fine powder, particularly in a controlled manner, that no precipitate is formed. It is difficult, if not impossible to define what a "controlled manner" would exactly be since the rate of addition and mixing would depend on a number of factors, including, but not necessarily limited to, the density of the brine, the nature of the cation used to make the brine, the size and nature of the additive powders, the temperature of the brine, and the interrelations of these factors.

One having ordinary skill in the art would normally expect the addition of the carbonate and/or bicarbonate in solid form to precipitate the brine forming cation. (For instance, in the non-limiting example of a zinc bromide brine, it would be expected that zinc oxide and/or other materials would precipitate). Without wishing to be bound by any one theory, it may be that the use of a powder prevents localized high concentrations of the carbonate and/or bicarbonate additive, where high localized concentrations would cause precipitation. In these brine systems, once precipitation occurs, it is very difficult to solubilize the precipitate again. High localized concentrations are believed to be the cause of precipitation when neutralizing liquid bases are used with these brines. In any case, it has been found that it is impossible to stir the high-density brines fast enough when a neutralizing base is added in liquid form.

Indeed, powders too small, e.g. below 5 microns in size, may dissolve sufficiently quickly to result in localized concentrations adequately high enough to cause precipitation, in one non-limiting embodiment. The use of powders has the additional advantage of not including an inert liquid solvent in the product that would add to shipping, storage and handling costs.

The treated brine fluids may include, but are not necessarily limited to packer fluids, completion fluids, workover fluids, and the like. These fluids are pumped downhole through a well bore in an operation to recover hydrocarbons from a subterranean formation. Any high-density brine containing salts that cause corrosion problems may be treated with the method of the invention. The method of this invention raises the pH of these fluids and thus lowers their acidity and improves or eliminates their corrosivities.

The invention is expected to be useful for any high-density fluid having a density of greater than about 8.4 pounds/gallon (1.0 kg/l), preferably from about 8.4 to about 22.5 lbs/gal (1.0–2.7 kg/l), most preferably from about 9.0 to about 22.0 lbs/gal (1.1–2.6 kg/l) and which has low pH, i.e., which is less than neutral. In one non-limiting embodiment of the invention, the density of the high density brine is at least about 11 lb/gal (1.3 kg/l). The salt in the water to make the brine may be a chloride, bromide, formate or acetate salt. The salt cations may be lithium, sodium, potassium, calcium, magnesium, zinc, ammonium, cesium, and rare earths. Mixtures of salts may also be employed. In fact, such mixtures are common. For instance, zinc salts are often mixed with calcium salts in a non-limiting embodiment, for commercial purposes to reduce the cost of using zinc salts. In one non-limiting embodiment, zinc sources are preferred, and zinc chloride and zinc bromide are particularly preferred zinc sources. Rare earths have their common definition of one or more of a group of 14 chemically related elements in row 6 of the Periodic Table ranging from lanthanum to ytterbium, inclusive. In one non-limiting embodiment of the invention, the brine may include up to 35 wt. % potassium formate, preferably from about 0.1 to about 30 wt. %.

The additive may be any suitable water-soluble carbonate or water-soluble bicarbonate or combination thereof that is effective in increasing the pH of the brines in question. In particular, the suitable carbonates and bicarbonates have sodium, potassium, magnesium and ammonium as the cations thereto. Carbonates and bicarbonates of different cations may be used together. It will also be appreciated that the carbonates as defined herein include double salts of hydroxides. Such double salts are particularly formed by alkaline earth metals, e.g. magnesium.

While not wishing to be limited to a particular mechanism or explanation of how the invention operates, the carbonates and bicarbonates may be understood as those that are capable of absorbing some of the acid. However, it should be clear that in this invention it is the carbonate ion that is consuming the acid and not the cation, such as ammonium ion.

As noted, compounds such as sodium, potassium, and/or ammonium carbonate and bicarbonates are solids that dissolve over a relatively short period of time. The addition of these additives to the brines causes the evolution of carbon dioxide gas (CO2) that should generally be purged from the brine. In one non-limiting embodiment of the invention, the carbonate and/or bicarbonate additive should be added to the brine just before the point at which precipitation of the zinc (or other salt metal) would occur. This precipitation is undesirable.

Also in a preferred, but non-limiting embodiment, the powdered additive is present in a concentration ranging from about 0.05 moles additive per mole of cation (e.g. $Zn^{++}$) to about 2.0 moles additive per mole of cation, preferably from about 0.05 moles additive per mole of cation to about 1.5 moles additive per mole of cation. These ranges may be different for cations other than $Zn^{++}$. In another non-limiting embodiment of the invention, the amount of additive is from about 0.1 to 10 wt. % based on the amount of water-soluble cation (e.g. zinc or other cation) in the brine. Preferably, the amount of additive is from about 0.1 to about 5 wt. %, most preferably from about 0.1 to about 0.5 wt. %. Too much of any additive, such as ammonia, causes a precipitate, which is undesirable.

The greater the amount of additive added to the brine, the better the corrosion properties of the brine will be. However, increasing proportions of additive tends to decrease the stability of the brine. In some instances, as the concentration of additive approaches 1% w/w based on the total amount of brine, the solution may begin to precipitate depending upon a number of complex, interrelated factors. The degree of precipitation is directly proportional to the amount of additive added. This precipitation results in loss of density, which reduces its utility.

The lower acidity achieved by the invention may result from simple acid-base neutralization, or may possibly arise from additive forming complexes with zinc (or other water-soluble cation) suppressing the hydrolysis of the complexed water molecules. However, it will be understood that the invention is not limited to any particular explanation of the mechanism by which it might work.

The method and additives of this invention are useful to inhibit the corrosion of iron-based metals and alloys such as steels. The additives and methods of the present invention would also be expected to be effective in inhibiting the corrosion of low alloy steels, carbon steels, stainless steels, nickel-based alloys, and the like. The corrosion of copper alloys may also be inhibited by the compositions and methods of this invention, but there is a possibility that nitrogen-containing materials may cause undesired cracking in copper alloys.

Using the compositions and methods of this invention, corrosion rates with N-80 steel may be reduced by two orders of magnitude and more in comparison with corrosion rates in conventional zinc-based brine of the same density. It is further expected that the thermal stability of viscosifiers in zinc-brine-based brines should be enhanced significantly. Suitable viscosifiers include, but are not necessarily limited to, for example, polysaccharides and viscoelastic surfactants. Low pH brines reacts with the polysaccharide by acid hydrolysis of the polymer linkages, which thus undesirably reduces the viscosity and stability of the fluid.

Conventional drilling and/or completion fluid additives may, of course, be employed in the brine fluids of this invention, including, but not necessarily limited to, wetting agents, viscosifiers, suspending agents, weighting agents, shale stabilizers, filtration control additives, anti-balling additives, lubricants, seepage control additives, lost circulation additives, corrosion inhibitors, alkalinity control additives, thinners, dispersants, non-emulsifiers or demulsifiers, and the like. In other non-limiting embodiments of the invention, there are certain components that may be omitted from the brine fluids, that is, the brine fluids has an absence of these components which are of lesser importance, irrelevant or inapplicable to the invention or possibly deleterious in certain applications or circumstances. These less important, inert or perhaps deleterious components include viscosifiers (including high area silica and biopolymers such as hydroxyethyl cellulose), suspension additives, alkaline buffers, polar additives, bridging agents, dissolved carbon dioxide ($CO_2$) and proppants. Polar additives include additives having a molecular weight less than about 400 and containing one or more polar groups per molecule such as hydroxyl, amino, and combinations thereof.

Optionally, one or more conventional corrosion inhibitors may be used in the brines of this invention to further improve their corrosion properties. In another non-limiting embodiment of the invention, the additives are used in the absence of other, added corrosion inhibitors, particularly phosphate, nitrite and/or amine corrosion inhibitors. For yet another non-limiting embodiment of the invention, the additives are used in the absence of an added Group VB metal (previous IUPAC notation), and particularly in the absence of added arsenic.

As previously noted, in one embodiment of the invention, the brine fluids of this invention will find application in the recovering of hydrocarbons, such as in situations where control of pressure in a well is needed, in one non-limiting embodiment. These brine fluids must meet certain other specifications and parameters that do not apply to brine fluids in general. For instance, high density brine fluids must have an acceptable true crystallization temperature (TCT) and an acceptable last crystal to dissolve (LCTD) temperature.

The TCT is a thermodynamic property that is the point at which crystals are formed at equilibrium. The LCTD temperature is a physical property reflecting the temperature at which the last crystal disappears. Both of these parameters are particularly important for high density brines that are used in offshore drilling where the brine is subjected to the relatively cold region of the sea water before the brine is pumped downhole. Both the TCT and the LCTD points are defined by the composition of the brine, not the density of the fluid. Fluids with the same density can have different TCT and LCTD values.

For instance, the following two fluids have the same density and specific gravity, but quite different TCT and LCTD points:

|  | Fluid A-3 salt mixture | Fluid B-2 salt mixture |
| --- | --- | --- |
| Density, lb/gal | 18 | 18 |
| Specific gravity | 2.161 | 2.161 |
| $CaCl_2$, wt % | 4.91 | — |
| $CaBr_2$, wt % | 27.9 | 23.8 |
| $ZnBr_2$, wt % | 39.8 | 42.8 |
| TCT, °F. | 35 | −2 |
| LCTD, °F. | 47 | −15 |

In one non-limiting embodiment of the invention, the corrosion resistant, high-density brines of this invention containing at least three salts, in a non-limiting example $CaCl_2$, $CaBr_2$ and $ZnBr_2$, have a TCT that ranges between about 80 to about 0° F., and in an alternate embodiment ranges between about 70 to about 5° F., and in still another non-limiting embodiment ranges between about 60 to about 10° F. Although the LCTD may fall into these same ranges for 3-salt brines, it will be appreciated, particularly from the above Fluids A and B, that the TCT and LCTD are not the same, and are in fact rarely the same. For high-density brines of this invention containing at least two salts, in a non-limiting example $CaBr_2$ and $ZnBr_2$, they may have a TCT that ranges between about −70 to about 20° F., and in an alternate embodiment ranges between about −65 to about 15° F. Again, the LCTD may fall into these same ranges for 2-salt brines, but is not necessarily the same value as the TCT.

The invention is further illustrated by the following Examples, which are only meant to further illuminate the invention and not limit it in any way.

EXAMPLES 1–2

Brine solutions containing various amounts of soluble sodium carbonates or bicarbonates were prepared. These solutions were prepared by vigorously stirring a high-density brine solution to which had been added a powdered carbonate or bicarbonate. The resultant solution is purged with nitrogen to remove dissolved carbon dioxide gas. The resultant solutions were tested at 350° F. (177° C.) for 24 hours on N-80 tubing steel, as shown in Table I.

TABLE I

Raising pH and Corrosion Resistance Using Sodium Bicarbonate

| Ex. | Initial fluid density, lb/gal (kg/m³) | pH[1] | Additive | Resultant density, lb/gal (kg/m³) | Corrosion losses, lbs/ft² (kg/m²) |
| --- | --- | --- | --- | --- | --- |
| 1 | 19.7 (2.36 × 10³) | 5.87 | None | 19.7 (2.36 × 10³) | 0.067 (0.33) |
| 2 | 19.7 (2.36 × 10³) | 6.70 | DKI-13[2] | 19.6 (2.35 × 10³) | 0.030 (0.15) |

[1]pH was determined in a 1 to 100 diluted solution of the brine in distilled water.
[2]DKI-13 is sodium bicarbonate in powder form.

It will be appreciated that using the indicated level of additive in accordance with this invention that the corrosion rate of the high-density brine of these Examples was reduced by about half.

In the foregoing specification, the invention has been described with reference to specific embodiments thereof, and has been demonstrated as effective in providing brine fluids having increased pH and corrosion resistance with little decrease in density. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, specifically salts and additives, in other proportions or added in different ways, falling within the claimed parameters, but not specifically identified or tried in a particular composition to improve the brines herein, are anticipated to be within the scope of this invention. Further, highly porous granules of carbonates and bicarbonates with relatively large surface areas that dissolve at the same rates as the powders described herein are also within the scope of this invention, even though their nominal diameters may be outside some of the ranges described.

I claim:

1. A corrosion resistant brine fluid made by the process comprising:
   providing a brine selected from the group consisting of packer fluids, completion fluids and workover fluids, the brine comprising:
      water;
      at least one source of water-soluble zinc cations to form a brine with the water; and
      an absence of a precipitate; and
   adding a brine-soluble additive selected from the group consisting of carbonates, bicarbonates, and mixtures thereof where the cation of the additive is selected from the group consisting of sodium, potassium, magnesium, ammonium and mixtures thereof, where the additive is in the form of a powder in an amount effective to increase the pH of the brine fluid and at a controlled rate that forms no precipitate;
   where the density of the brine is at least 11 pounds/gal, where the brine is not a saturated brine, and where in the case there are at least two different sources of water-soluble cations the true crystallization temperature (TCT) and the last crystal to dissolve (LCTD) temperature independently range between about −70 to about 20° F., and where in the case there are at least three different sources of water-soluble cations the true crystallization temperature (TCT) and the last crystal to dissolve (LCTD) temperature independently range between about 80 to about 0° F.

2. The corrosion resistant brine fluid of claim 1 further comprising at least one non-emulsifier and at least one wetting agent.

3. The corrosion resistant brine fluid of claim 1 where the source of water-soluble zinc cations is at least one zinc salt selected from the group consisting of chloride, bromide, acetate, and formate salts.

4. The corrosion resistant brine fluid of claim 1 where the source of water-soluble zinc cations is selected from the group consisting of zinc chloride and zinc bromide.

5. The corrosion resistant brine fluid of claim 1 where the additive is selected from the group consisting of sodium carbonate, sodium bicarbonate, and mixtures thereof.

6. The corrosion resistant brine fluid of claim 1 where the additive is present in a mole ratio to the total amount of water-soluble cation ranging from about 0.05/1 to about 2.0/1.

7. The corrosion resistant brine fluid of claim 1 where the additive is present in an amount from 0.1 to 10 wt. % based on the total amount of water-soluble cation.

8. The corrosion resistant brine fluid of claim 1 where in the process of adding the additive, the additive powder ranges in size from about 5 to about 500 microns.

9. The corrosion resistant brine fluid of claim 1 where in the case there are two different sources of water-soluble cations, the sources are zinc bromide and calcium bromide, and in the case there are three different sources of water-soluble cations, the sources are zinc bromide, calcium chloride and calcium bromide.

10. A corrosion resistant brine fluid made by the process comprising:

providing a brine selected from the group consisting of packer fluids, completion fluids and workover fluids, the brine comprising:
water;
at least one non-emulsifier;
at least one wetting agent; end
at least one source of water-soluble zinc cations to form a brine with the water; and
an absence of a precipitate; and adding a brine-soluble additive selected from the group consisting of carbonates, bicarbonates, and mixtures thereof where the cation is selected from the group consisting of sodium, potassium, magnesium, ammonium and mixtures thereof, where the additive is in the form of a powder, in an amount effective to increase the pH of the brine fluid and at a controlled rate that forms no precipitate;

where the density of the brine is at least 11 pounds/gal, where the brine is not a saturated brine, and where in the case the sources of water-soluble cations are at least zinc bromide and calcium bromide the true crystallization temperature (TCT) and the last crystal to dissolve (LCTD) temperature independently range between about −70 to about 20° F., and where in the case the sources of water-soluble cations are at least zinc bromide, calcium chloride and calcium bromide the true crystallization temperature (TCT) and the last crystal to dissolve (LCTD) temperature independently range between about 80 to about 0° F.

* * * * *

UNITED STATES PATENT AND TRADEMARK OFFICE
CERTIFICATE OF CORRECTION

PATENT NO.   : 6,894,008 B2
DATED        : May 17, 2005
INVENTOR(S)  : Michael L. Walker It is certified that error appears in the above-identified patent and that said Letters Patent is hereby corrected as shown below:

Column 7,
Line 23, "2.011" should read -- 2.0/1 --.

Signed and Sealed this

Twenty-ninth Day of November, 2005

JON W. DUDAS
*Director of the United States Patent and Trademark Office*